(12) United States Patent
Lu

(10) Patent No.: US 6,522,401 B2
(45) Date of Patent: Feb. 18, 2003

(54) LIGHT MEASURING DEVICE FOR A PLANE LIGHT SOURCE

(75) Inventor: Jih-Yung Lu, San-Chung (TW)

(73) Assignee: Benq Corporation, Taoyuan (TW)

( * ) Notice: Subject to any disclaimer, the term of this patent is extended or adjusted under 35 U.S.C. 154(b) by 85 days.

(21) Appl. No.: 09/779,486

(22) Filed: Feb. 9, 2001

(65) Prior Publication Data

US 2001/0043325 A1 Nov. 22, 2001

(30) Foreign Application Priority Data

May 22, 2000 (TW) ........................................ 89109868 A

(51) Int. Cl.$^7$ ................................................. G01T 1/00
(52) U.S. Cl. ....................................... 356/213; 356/226
(58) Field of Search ................................ 356/213, 218, 356/226, 216, 234

(56) References Cited

U.S. PATENT DOCUMENTS

| | | | | |
|---|---|---|---|---|
| 4,739,414 A | * | 4/1988 | Pryor et al. ................. | 358/285 |
| 5,483,318 A | * | 1/1996 | Hamada et al. ............. | 354/402 |
| 5,568,187 A | * | 10/1996 | Okino ........................... | 10/96 |
| 5,973,789 A | * | 10/1999 | Wendt et al. ................ | 356/447 |
| 6,310,687 B1 | * | 10/2001 | Stumbo et al. ............. | 356/317 |

* cited by examiner

Primary Examiner—Daniel St. Cyr
(74) Attorney, Agent, or Firm—Winston Hsu

(57) ABSTRACT

A light-measuring device comprises a photosensor, a light shield and a control device. The light shield has a plurality of apertures. Light from a luminous surface of a plane light source project onto the photosensor through the apertures of the light shield to form a plurality of non-overlapping photosensing areas on the photosensor. Each photosensing area on the photosensor generates a corresponding signal. The control device analyzes the corresponding signals from the photosensing areas to check the light from each corresponding test area on the luminous surface. With the light-measuring device, a tester can adjust the color temperature and brightness values of the plane light source.

12 Claims, 4 Drawing Sheets

LIGHT MEASURING DEVICE FOR A PLANE LIGHT SOURCE

BACKGROUND OF THE INVENTION

1. Field of the Invention

The present invention relates to a light measuring device, and more particularly, to a light-measuring device for a plane light source.

2. Description of the Prior Art

Measuring the brightness value or color temperature of a normal plane light source, such as a back-lit board or faceplate of a liquid crystal display (LCD), or a back-lit board of a scanner, is necessary to ensure the quality of the plane light source and to form a basis for adjusting the illumination characteristics of the plane light source.

One method of the prior art for measuring a plane light source is to measure a plurality of test points on the luminous surface of the plane light source with a photometer. A tester uses a photometer to detect the brightness value of each test point and then compute the average brightness value. However, for each test point to be tested, the tester must move the photometer to a predetermined position. Thus, the more test points there are, the more time is spent testing, and the more inconvenient the method becomes.

Another method of the prior art to effect the measurement is to use a digital camera to detect the brightness values or gray-level values of all areas on the luminous surface of the plane light source. From this the average brightness value or the average gray-level value can be computed. Although, with this method, the speed of the measurement is faster, the accuracy is not so high. The brightness values of the areas near the edge of the luminous surface register less than other areas of the luminous surface, and the digital camera is unable to analyze light that radiates at small angles from the luminous surface.

SUMMARY OF THE INVENTION

It is therefore a primary objective of this invention to provide a light-measuring device for a plane light source. The light-measuring device is able to measure light radiating from a luminous surface of a plane light source both quickly and accurately.

The light-measuring device comprises a photosensor, a light shield, a control device and a driving device. The light shield has a plurality of apertures. The light from the luminous surface of the plane light source projects onto the photosensor through the plurality of apertures of the light shield to form a plurality of non-overlapping photosensing areas on the photosensor. Each photosensing area on the photosensor generates a corresponding signal. The control device analyzes the corresponding signals to check the light from each corresponding area on the luminous surface. With the light-measuring device, a tester can adjust the color temperature and brightness values of the plane light source.

DETAILED DESCRIPTION OF THE PREFERRED EMBODIMENT

Figure 1:
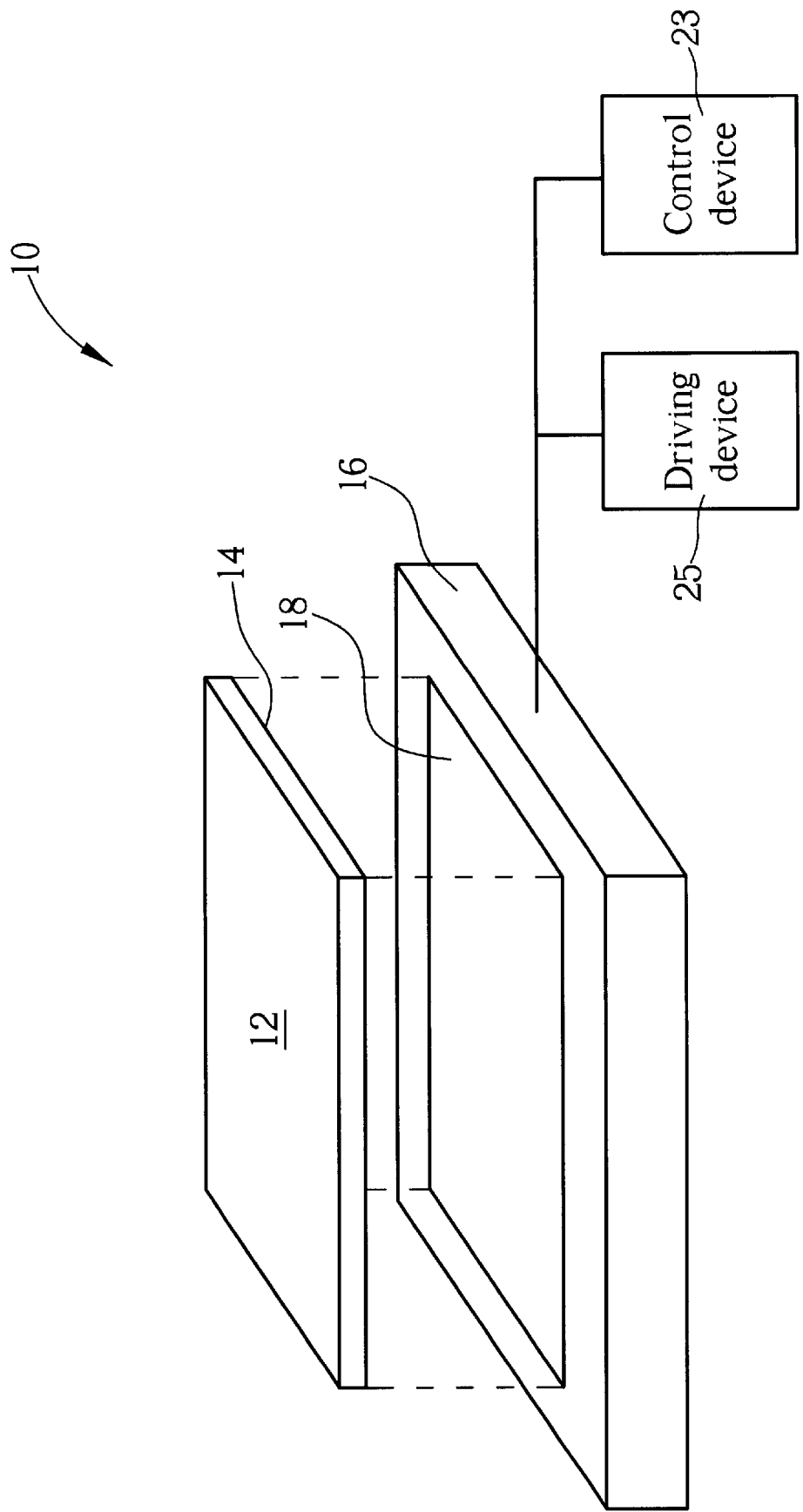
FIG. 1 is a schematic diagram of a present invention first embodiment light-measuring device.
Figure 2:
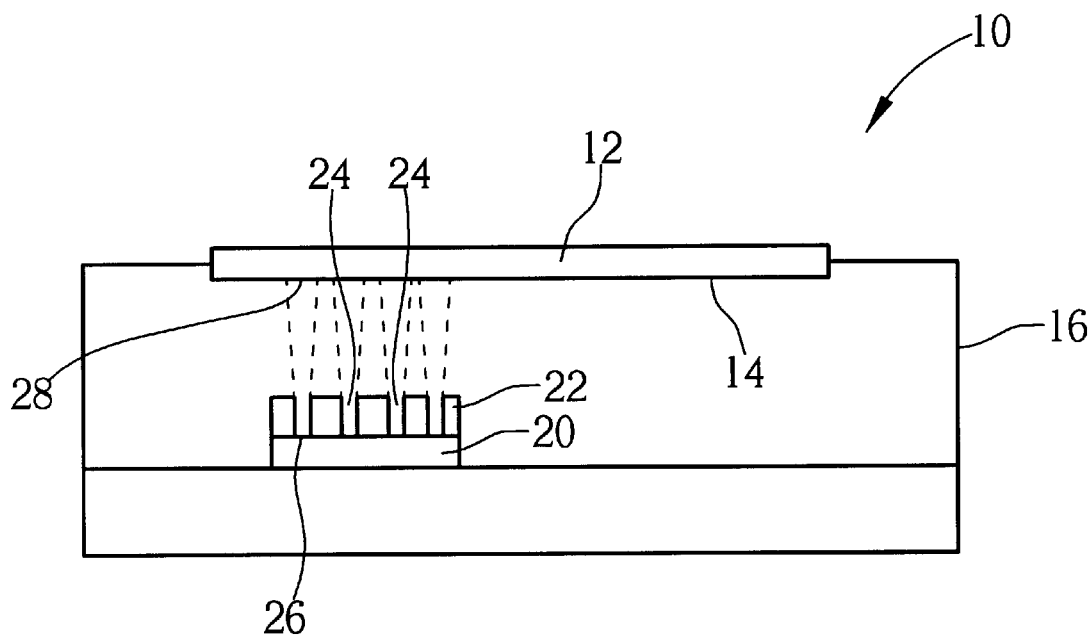
FIG. 2 is a cross-sectional diagram of a present invention first embodiment light-measuring device.

Please refer to FIG. 1 and FIG. 2. FIG. 1 is a schematic diagram of a present invention first embodiment light-measuring device 10. FIG. 2 is a cross-sectional diagram of the present invention first embodiment light-measuring device 10. The light measuring device 10 is used to measure light radiating from a luminous surface 14 of a plane light source 12. The light-measuring device 10 comprises a housing 16, a photosensor 20, a light shield 22, a control device 23 and a driving device 25. The housing 16 has an opening 18 in its top. The light shield 22 is positioned above the photosensor 20 and has a plurality of apertures 24. The control device 23 is electrically connected to the photosensor 20 and is used to analyze the signal from the photosensor 20. The driving device 25 is electrically connected to the control device 23 and is used to drive the photosensor 20 and the light shield 22.

When a tester measures the light from the plane light source 12, the plane light source is placed above the opening 18 and the luminous surface 14 of the plane light source 12 faces down. The photosensitive surface of the photosensor 20 is parallel with the luminous surface 14 of the plane light source 12. The distance between the photosensitive surface and the luminous surface 14 is less than a specific interval. The depth and the diameter of the plurality of apertures 24 determine the specific interval. The light from the luminous surface 14 of the plane light source 12 projects onto the photosensor 20 through the plurality of apertures 24 of the light shield 22 to form a plurality of non-overlapping photosensing areas 26 on the photosensor 20. Each photosensing area 26 corresponds to a test area 28 on the luminous surface 14 of the plane light source 12. The distance between the photosensitive surface of the photosensor 20 and the luminous surface 14 of the plane light source 12 is less than the specific interval, which ensures that the test areas 28 on the luminous surface 14 of the plane light source 12 do not overlap.

Figure 6:
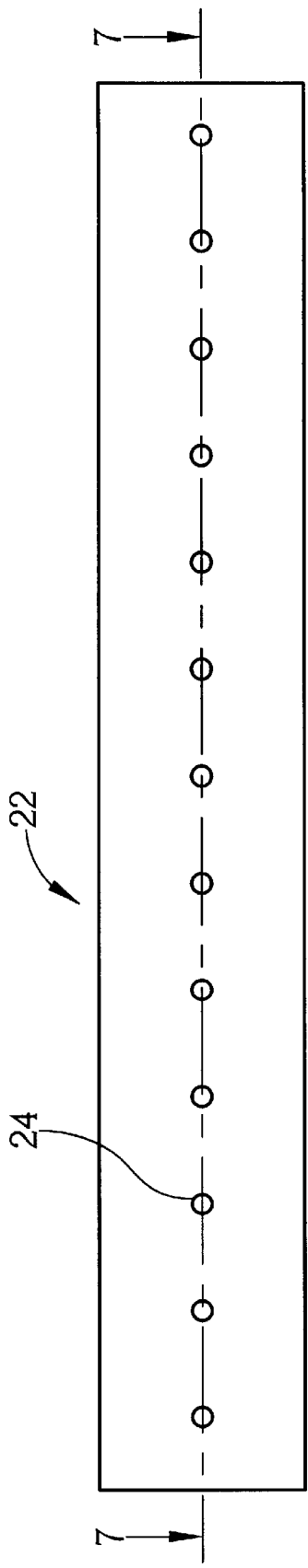
FIG. 6 is a top view of a light shield shown in FIG. 2.
Figure 7:
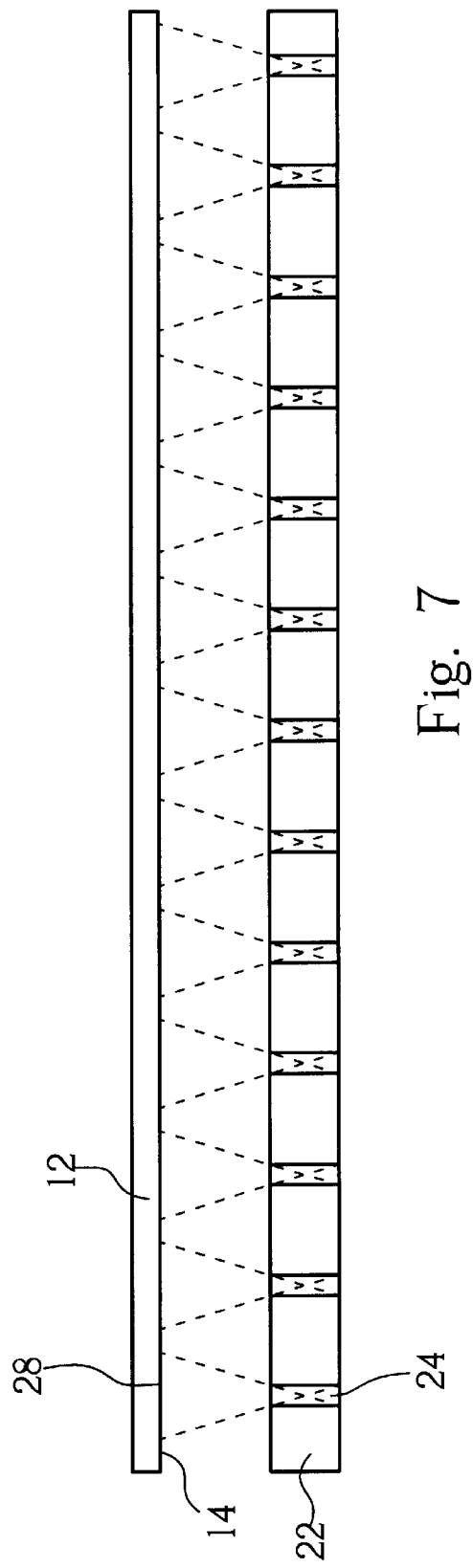
FIG. 7 is a sectional view of the light shield shown in FIG. 6.

Please refer to FIG. 2, FIG. 6 and FIG. 7. FIG. 6 is a top view of the light shield 22 shown in FIG. 2. FIG. 7 is a sectional view along line 7—7 of the light shield 22 shown in FIG. 6. The photosensor 20, in the first embodiment, is a charge-coupled device (CCD). The CCD is a linear-type CCD and arranged on the photosensitive surface of the photosensor 20. The light shield 22 is made of an opaque material and has a plurality of apertures 24. In this embodiment, the thickness of the light shield 22 is 10 mm (0.3937 inches). The diameter of each aperture on the light shield 22 is 2 mm (0.07874 inches). The interval between two neighboring apertures is 15 mm (0.5906 inches), and the distance between the upper surface of the light shield 22 and the luminous surface 14 is 20 mm (0.7874 inches). In FIG. 7, none of the test areas 28 on the luminous surface 14 of the plane light source 12 overlap.

The control device 23 commands the driving device 25. The driving device 25 drives the photosensor 20 and the light shield 22. Using the driving device 25, the photosensor 20 scans the entire area of the luminous surface 14 of the plane light source 12 and then the control device 23 analyzes the signals gathered from the photosensing areas 26 of the photosensor 20. In this manner, the control device 23 checks the light radiating from each corresponding test area 28 on the luminous surface 14, and, in conjunction with the driving device 25, all of the test areas 28 would cover the luminous surface 14 completely. Hence, the control device 23 obtains the brightness values or color temperatures and then computes their average values.

Because the light projects onto the photosensor 20 through the apertures 24 of the light shield 22 to form a plurality of photosensing areas 26 on the photosensor 20, the light measuring device 10 simultaneously measures the light from a plurality of corresponding test areas 28 on the luminous surface 14. The speed of the measuring process is thus quicker than that of the prior art. Additionally, by carefully selecting the depth and the diameter of the apertures 24, and the distance between the photosensitive surface of the photosensor 20 and the luminous surface 14, the test areas 28 are made small enough to ensure accurate measurements.

Figure 3:
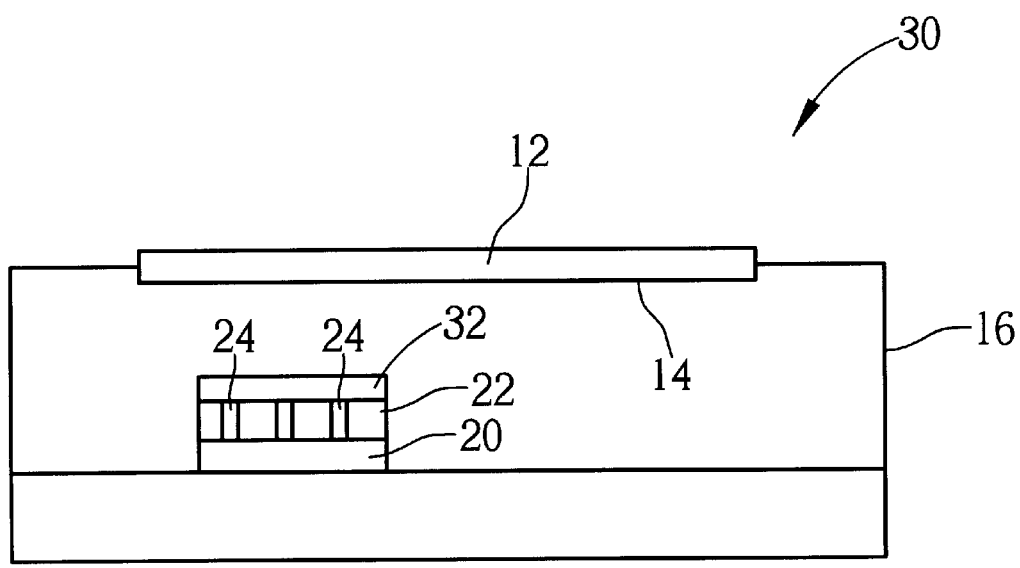
FIG. 3 is a cross-sectional diagram of a present invention second embodiment light-measuring device.
Figure 4:
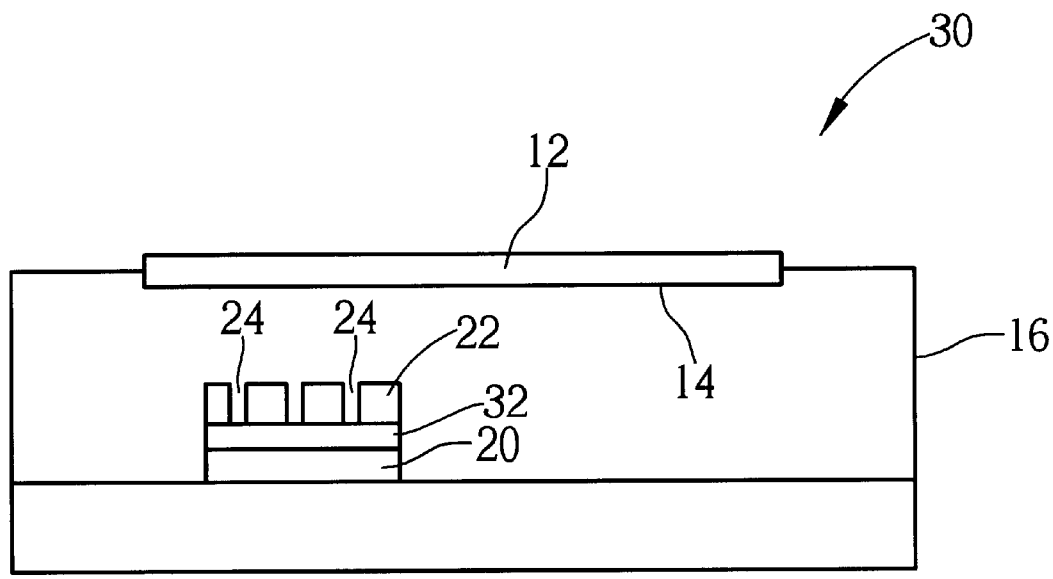
FIG. 4 is another cross-sectional diagram of a present invention second embodiment light-measuring device.

Please refer to FIG. 3 and FIG. 4. FIG. 3 is a cross-sectional diagram of a present invention second embodiment light-measuring device 30. FIG. 4 is another cross-sectional diagram of the light-measuring device 30. The light-measuring device 30 further comprises a neutral density filter 32. The neutral density filter is positioned between the light shield 22 and the photosensor 20, or positioned above the light shield 22. The neutral density filter 32 is used to prevent saturation of the photosensor 20 due to overexposure from excessive illumination.

Figure 5:
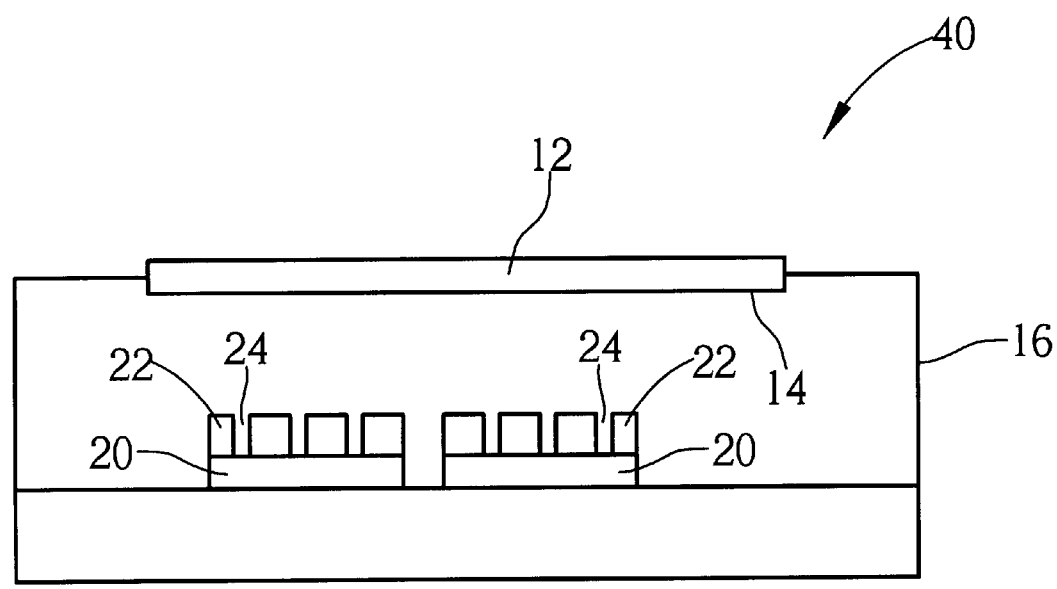
FIG. 5 is a cross-sectional diagram of a present invention third embodiment light-measuring device.

Please refer to FIG. 5. FIG. 5 is a cross-sectional diagram of a present invention third embodiment light-measuring device 40. To lessen the time required to perform the measurement, a plurality of photosensors 20 are installed in the housing 16 of the light measuring device 40. Upon each photosensitive surface of the photosensors 20, there is a light shield 22. When a tester uses the light-measuring device 40, the control device 25 is programmed to drive every photosensor 20 simultaneously along a moving route that keeps the photosensor 20 from overlapping. In this manner, all of the photosensors 20 scan the entire area of the luminous surface 14 of the plane light source 12 in a shorter time. Assuming that the results of the measurement are satisfactory, a tester can decrease the time required for each measurement with the light measuring device 40 when he or she measures a larger sized plane light source.

With the three embodiments described above, the plane light source 12 is immovable. Instead, the measurement is achieved by moving the photosensor 20 and the light shield 22. Obviously, by moving the plane light source 12 while keeping the photosensor 20 and the light shield 22 stationary can also effect the measurement. Additionally, if both the lengths of the photosensor 20 and the light shield 22 are greater than the length or width of the plane light source 12, the photosensor 20 and the light shield 22 can complete the measurement by moving in one direction only. Finally, if the plurality of apertures 24 are arrayed in a matrix formation on the light shield 22, and the area of the photosensitive surface of the photosensor 20 is greater than the area of the plane light source 12, the measurement can be achieved without any relative motion between the photosensor 20 and the plane light source 12.

In contrast to the prior art, the present invention utilizes a light shield 22 having a plurality of apertures 24 to let light from the luminous surface 14 of the plane light source 12 project onto the photosensor 20 through the apertures 24 of the light shield 22 and form a plurality of photosensing areas 26 on the photosensitive surface of the photosensor 20. By analyzing the signals from the photosensing areas 26, the control device 23 is able to determine the brightness values and compute the average brightness value quickly and accurately.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light measuring device to measure light radiated from a plane light source, a luminous surface located on a bottom surface of the plane light source, the light measuring device comprising:

a photosensor located under the plane light source for generating a signal, the photosensor has a photosensitive surface parallel with the luminous surface on the top of the photosensor;

a light shield made of an opaque material located above the photosensitive surface of the photosensor, the light shield having a plurality of apertures; and a control device electrically connected to the photosensor, the control device analyzing the signal from the photosensor so that the control device is able to analyze the light from the plane light source;

wherein the light from the luminous surface of the plane light source projects onto the photosensor through the apertures of the light shield to form a plurality of photosensing areas on the photosensor with no image being present between the plane light source and the photosensor, each photosensing area having a corresponding test area on the luminous surface, the control device analyzing the signal to check the light from each corresponding test area on the luminous surface for testing or calibrating the plane light source.

2. The light measuring device of claim 1 wherein the corresponding test areas on the luminous surface do not overlap.

3. The light measuring device of claim 2 wherein the distance between the photosensitive surface and the luminous surface is less than a specific interval that just ensures the photosensing areas on the photosensor do not overlap, the specific interval being determined by the depth and diameter of the apertures of the light shield.

4. The light-measuring device of claim 1 wherein the photosensor is a charge coupled device (CDD).

5. The light measuring device of claim 1 wherein the control device analyzes the signal to determine the color temperature or the brightness values of the corresponding test areas on the luminous surface, and determines the average color temperature or the average brightness values of the light from the plane light source.

6. The light measuring device of claim 1 wherein the plane light source is a back-lit board or faceplate of a liquid crystal display (LCD).

7. The light measuring device of claim 1 further comprising a casing with an opening wherein the plane light source is horizontally positioned on the opening with the luminous surface facing down, the light shield and the photosensor are horizontally positioned under the opening.

8. The light measuring device of claim 7 wherein the photosensor is linearly arranged on the photosensitive surface and the plurality of apertures are arranged linearly.

9. The light measuring device of claim 8 wherein the photosensor and the light shield are moveably installed in the casing, and the light measuring device further comprises a driving device that is used to drive the photosensor and the light shield so that the photosensor scans all areas of the luminous surface of the plane light source.

10. The light measuring device of claim 1 further comprising a neutral density filter, the neutral density filter positioned between the plane light source and the photosensor, the neutral density filter being used to prevent saturation of the photosensor due to overexposure from excessive illumination.

11. The light measuring device of claim 10 wherein the neutral density filter is installed above the light shield.

12. The light measuring device of claim 10 wherein the neutral density filter is installed between the light shield and the photosensor.

* * * * *